UNITED STATES PATENT OFFICE.

CHARLES N. MERIWETHER, OF CLARKSVILLE, TENNESSEE.

METHOD OF TREATING PHOSPHATES.

1,149,390. Specification of Letters Patent. Patented Aug. 10, 1915.

No Drawing. Application filed November 18, 1913. Serial No. 801,644.

*To all whom it may concern:*

Be it known that I, CHARLES N. MERIWETHER, a citizen of the United States, residing at Clarksville, in the county of Montgomery and State of Tennessee, have invented certain new and useful Improvements in Methods of Treating Phosphates; and I do declare the following to be a full, clear, and exact description of the invention, such as will enable others skilled in the art to which it appertains to make and use the same.

This invention relates to phosphates and method of treating them.

The object of the invention is to provide a method of treating phosphate to render it effective as a plant food, and which, when so treated, has a basic re-action which is good for the majority of plants on most soils.

The phosphate material, which may be in the form of rock or otherwise, is first pulverized and mixed with a portion of iron, from five to twenty per cent. of the phosphates of lime, iron, and aluminum present. If the material does not contain naturally any lime, or magnesia in some form other than phosphate, enough lime or magnesia salts, or both, are added to the mixture to render the total of such addition from 10 to 30 per cent. The iron is preferably used in the form of machine borings or turnings or scraps not heavier than a quarter of an ounce. Part of the iron, from 25 to 70 per cent., is preferably replaced with mill scale which is the burnt scale that separates from iron when working it hot. This mixture is then placed in a furnace and heated until it fuses, approximately to 1400° C. It may then be run out, allowed to cool, and then pulverized and used as a fertilizer.

For many purposes, it is desirable to add to the mixture while in a molten state, a combination of potash or soda oxids or salts, so that the fertilizer will analyze when completed, 1 to 10 per cent. of potash $K_2O$ and 1 to 10 per cent. $Na_2O$. For some purposes, one only of these elements will be added. This addition of alkalis may be made after the material has cooled. But in that case, the whole must be fused again. If an excess of iron has been used, it should be removed by use of a magnet or otherwise, and may be used for adding to the next batch of material, or sold as a by-product.

The product as made with the addition of iron ore, iron and mill scale and lime is the same as basic slag, but when an alkali is added, it becomes more soluble and more available to plants, and any excess of iron may be more easily removed and the same process may be applied to basic slag to improve its solubility and extract the iron which it contains.

The fertilizer prepared as above described, has a basic re-action which greatly improves most plants when applied thereto, but when it is to be used in combination with a substance which will generate ammonia, it is rendered neutral by adding to it carbonic acid or some other acid, or a superphosphate or sulfate.

I claim as my invention:—

1. A process of manufacturing phosphate fertilizer which consists in pulverizing the phosphate material and mixing it with a proportion of cold iron and then adding lime and magnesia salts, then placing the mixture in a furnace and heating it till it fuses, then adding to the mixture while in a molten state, potash and soda oxid, then running out the so fused mixture, allowing it to cool, and finally pulverizing it to render it ready for use.

2. A process of manufacturing phosphate fertilizer which consists in pulverizing the phosphate material, mixing with a mixture of iron and mill scale in a cold state, then adding lime, fusing this compound, then adding soda and potash, then extracting any excess of iron present, and finally pulverizing it to render it ready for use.

3. A process of producing basic phosphate of lime from phosphate bearing material which consists in mixing it with cold iron and adding to it a portion of alkali, then fusing said material, and then pulverizing it and extracting the excess of iron, rendering it more fit for use as a fertilizer.

4. A process of manufacturing phosphate fertilizer which consists in combining ten per cent. more or less of cold iron with five times as much, more or less of pulverized phosphate of lime, then fusing the mixture and adding an alkali thereto.

5. A process of making phosphate fertilizer which consists in combining ten per cent. more or less of cold iron in small pieces with ninety per cent. more or less of phosphatic lime stone or its equivalent in a pulverized state, then fusing the mixture and adding an alkali thereto, then pulverizing the product and finally extracting the iron therefrom.

In testimony whereof I have hereunto set my hand in presence of two subscribing witnesses.

.CHARLES N. MERIWETHER.

Witnesses:
C. A. BAILEY,
W. M. ORAM.